(12) United States Patent
Phillips et al.

(10) Patent No.: US 8,249,970 B1
(45) Date of Patent: *Aug. 21, 2012

(54) SENSITIVITY/ELASTICITY-BASED ASSET EVALUATION AND SCREENING

(75) Inventors: G. Michael Phillips, Pasadena, CA (US); M. Chapman Findlay, III, Los Angeles, CA (US); Stephen A. Klein, Pasadena, CA (US); William P. Jennings, Simi Valley, CA (US); Mark E. Rice, Pasadena, CA (US)

(73) Assignee: c4cast.com, Inc., Pasadena, CA (US)

( * ) Notice: Subject to any disclaimer, the term of this patent is extended or adjusted under 35 U.S.C. 154(b) by 2737 days.

This patent is subject to a terminal disclaimer.

(21) Appl. No.: 10/346,794

(22) Filed: Jan. 17, 2003

Related U.S. Application Data

(62) Division of application No. 09/615,021, filed on Jul. 13, 2000, now Pat. No. 7,580,876.

(51) Int. Cl.
*G06Q 40/00* (2012.01)

(52) U.S. Cl. .......... 705/36 R; 705/35; 345/440
(58) Field of Classification Search .............. 705/35–45
See application file for complete search history.

(56) References Cited

U.S. PATENT DOCUMENTS

| | | | | |
|---|---|---|---|---|
| 6,125,355 | A | * | 9/2000 | Bekaert et al. ............. 705/36 R |
| 6,832,211 | B1 | * | 12/2004 | Thomas et al. ............. 705/36 R |

* cited by examiner

*Primary Examiner* — Richard C Weisberger
(74) *Attorney, Agent, or Firm* — Joseph G. Swan, P.C.

(57) ABSTRACT

Provided is a technique for evaluating an asset, such as a share of stock in a corporation, by processing historical data for value of an asset and historical data values for various exogenous variables to obtain a formula for calculating a measure of a tendency of the value of the asset to change as a result of changes in the data values for the exogenous variables, the formula being a function of the exogenous variables. Projected data values are then obtained for the exogenous variables, and a measure of the tendency of the value of the asset to change based on a change in at least one of the exogenous variables is estimated using the formula and the input projected data values.

16 Claims, 4 Drawing Sheets

SENSITIVITY/ELASTICITY-BASED ASSET EVALUATION AND SCREENING

This application is a divisional application of U.S. patent application Ser. No. 09/615,021, titled "Sensitivity/Elasticity-Based Asset Evaluation and Screening" filed on Jul. 13, 2000 now U.S. Pat. No. 7,580,876, which is incorporated herein by reference as though set forth herein in full.

BACKGROUND OF THE INVENTION

1. Field of the Invention

The present invention relates to asset evaluation and screening using price sensitivities, price elasticities, and similar indicators. The evaluation techniques of the present invention may be used, for example, in a financial asset evaluation/screening tool for evaluating and screening assets in connection with asset portfolio management or financial planning.

2. Description of the Related Art

Investors and financial managers have long applied stock screening tools for the purposes of identifying companies satisfying certain pre-specified requirements. For example, the Internet sites Marketguide.com, finance.yahoo.com, and Media General Corporation's CD database MegaInsight-.com, all allow for the identification of companies that satisfy such specified criteria. To date, these criteria have primarily included: accounting data and associated calculated ratios using data from a company's balance sheets and income statements, data regarding the company's stock price and trading volume, and other information describing the company, such as location of home office, industry code, or number of employees.

While such screening tools have been helpful to a point, the present inventors have concluded that more useful evaluation and screening tools and techniques are desirable in connection with portfolio management and financial planning.

SUMMARY OF THE INVENTION

The present invention addresses this need by providing an asset evaluation/screening tool in which different economic scenarios can be specified and elasticities, sensitivities or similar measures of tendency of the asset value to change based on changes in one or more exogenous variables can be projected under such different scenarios. Then, such data can be used to screen or otherwise evaluate assets.

Thus, in one aspect the invention is directed to evaluating an asset, such as a share of stock in a corporation, by processing historical data for value of an asset and historical data values for various exogenous variables to obtain a formula for calculating a measure of a tendency of the value of the asset to change as a result of changes in the data values for the exogenous variables, the formula being a function of the exogenous variables. Projected data values are then obtained for the exogenous variables, and a measure of the tendency of the value of the asset to change based on a change in at least one of the exogenous variables is estimated using the formula and the input projected data values.

In a preferred embodiment of the invention, the foregoing technique is incorporated into an asset evaluation/screening tool, allowing users to input various "what if" (i.e., hypothetical) scenarios with respect to any of a variety of macroeconomic, industry-specific, firm-specific or even non-financial data and then obtain projected elasticities, sensitivities or similar measures for selected assets with respect to selected factors based on the input scenario. In more particularized aspects of the invention, the projected elasticities, sensitivities or similar measures and/or projected asset values are used for screening assets. Screening based on such information often can provide the user with powerful tools for making financial decisions.

In a further aspect, the invention is directed to evaluating a portfolio of assets. Initially, historical data for value of an asset and historical data values for various exogenous variables are processed to obtain a price formula for estimating the value of the asset as a function of the exogenous variables. Then, a measure of a tendency of the value of the asset to change as a result of a change in the data value for at least one of the exogenous variables. Thereafter, the foregoing steps are then repeated for each of multiple assets. The calculated measures of tendency to change are then combined for each asset in a portfolio in order to determine a measure of the tendency of the value of the portfolio to change as a result of a change in the data value for such at least one exogenous variable. Finally, the asset composition of the portfolio is altered and the above combining step is repeated.

By virtue of the foregoing, the present invention can allow a user to explore "what if" scenarios with respect to different portfolio compositions in order to determine the effect of different asset allocations on the overall portfolio elasticities, sensitivities or similar measures with respect to specified factors.

The foregoing summary is intended merely to provide a brief description of the general nature of the invention. A more complete understanding of the invention can be obtained by referring to the claims and the following detailed description of the preferred embodiments in connection with the accompanying figures.

DETAILED DESCRIPTION OF THE PREFERRED EMBODIMENTS

The following disclosure pertains to multiple inventions that are claimed in separate patent applications. The commonly assigned patent applications filed of even date herewith and titled, "Identifying Industry Sectors Using Statistical Clusterization" and "Significance-Based Display" are incorporated herein by reference as though set forth herein in full.

Asset Evaluation and Screening.

The present invention provides asset evaluation and screening techniques that may be incorporated into an asset evaluation/screening tool for use in portfolio management and financial planning. In the preferred embodiments, the techniques of the present invention create a model for predicting the value of an asset (such as a stock) based on various exogenous variables. The model is generated by using historical data for the value of the asset and for the exogenous variables. Similar models are then created for a pool of other assets. Such models can then be used to perform "what if" analysis, allowing a user to input various scenarios and then obtain information as to how various characteristics of a specified asset will change. In addition, the techniques of the present invention can permit asset screening based on such characteristics.

Figure 1:
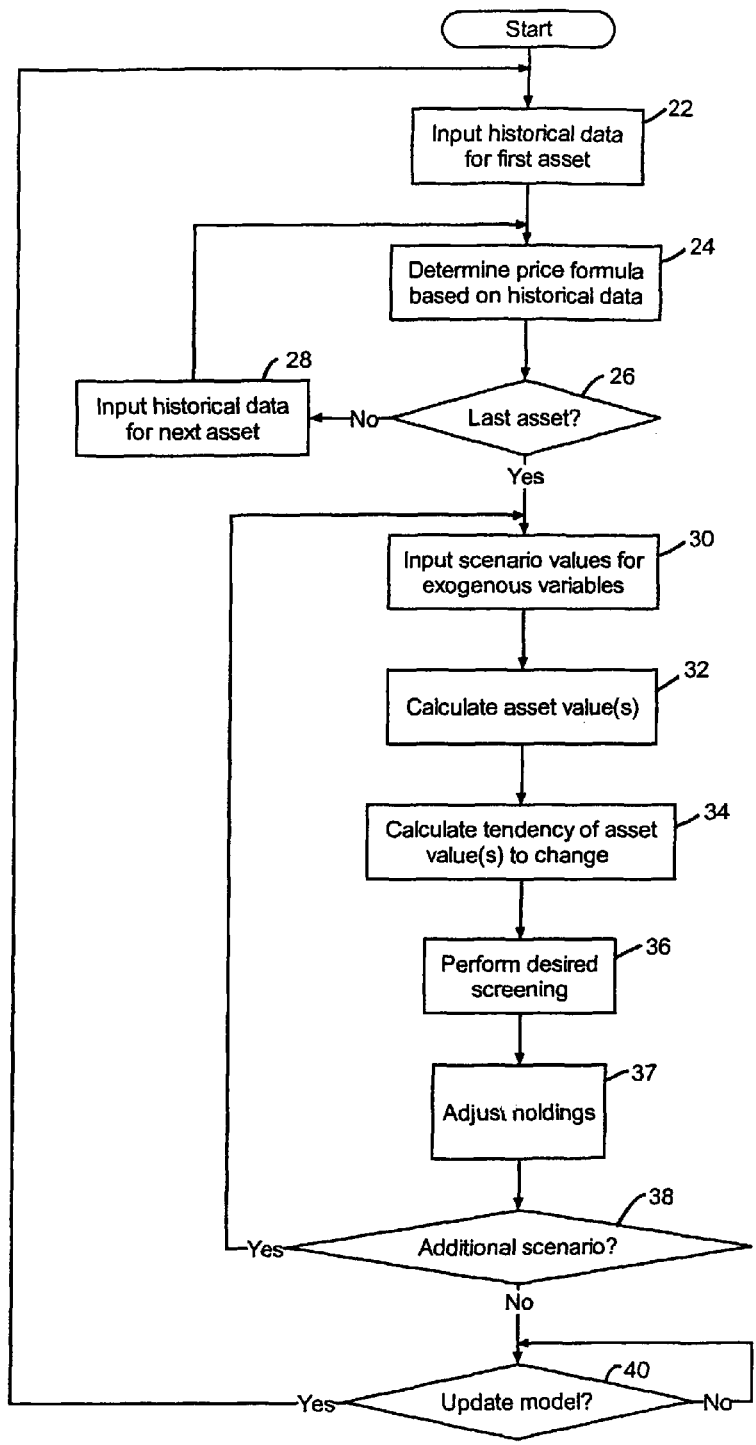
FIG. 1 is a flow diagram for explaining evaluation and screening of assets according to a representative embodiment of the invention.

FIG. 1 illustrates a flow diagram for explaining asset evaluation and screening according to a representative embodiment of the present invention. Briefly, according to FIG. 1, historical data are input for an asset; a price formula is determined for the asset based on the input historical data; the foregoing steps are repeated for different assets; scenario values are then input for certain exogenous variables; value(s) are calculated for selected asset(s) based on the input scenario; a tendency of the asset value to change is calculated, based on the input scenario; any desired screening is performed; the calculation of tendency of asset value(s) to change and screening steps may then be repeated for alternate exogenous variable scenarios; based on results of the foregoing evaluation and screening, asset holdings are adjusted; in addition, the models periodically are updated to incorporate new historical data.

In more detail, in step 22 historical data are input for the first asset. Such information preferably includes measurements of the value of the asset and other data that relate to general macroeconomic conditions, and also may include other information that is more specific to the asset. In the preferred embodiment of the invention, a list of such variables is specified and the data value for each variable is input at each of plural specified points in time over an extended time interval. For example, values for all variables at a predetermined time each day (e.g., the close of business, Pacific Time) may be input for each business day in a previous time period T, where T may be anytime period but preferably is at least 30 days in length, in order to obtain a statistically meaningful sample. For example, T may be 180 days, 1 year, 2 years, 3 years, 4 years or even longer. Currently, it is preferable to use a time period T of the immediately preceding 3 years.

Examples of the types of general macroeconomic data that may be included are any or all of the following: Federal Funds Rate Daily; 1-year Treasury Bill Rate; 10-year Treasury Constant Maturity Rate Daily; 30-year Treasury Constant Maturity Rate Daily; Moody's Seasoned Baa Corporation Bond Yield Daily; Consumer Debt Service Payments as Percent of Disposable Personal Income; Corporate Net Cash Flow; Net Foreign Investment; Total Consumer Credit Outstanding, Not Seasonally Adjusted; Trade Weighted Exchange Index: Major Currencies; Total Business Inventories: Manufacturers, Retailers & Merchant; Inventory/Sales Ratio: Total Business; Manufacturers New Orders: Non-defense Excluding Aircraft & Parts; Retail Sales, Not Seasonally Adjusted; New Privately Owned Housing Units Started: Structures with One Unit; Total Industrial Production Index; Oil Price Domestic: West Texas Intermediate; Real Gross Domestic Product in Chained 1996 Dollars; Real Gross Private Domestic Investment; National Defense Consumption Expenditures & Gross Investment; Real Nonresidential Investment: Equipment & Software; Real Net Exports; Consumer Price Index (CPI) for All Urban Customers; CPI—Energy; PPI—All Commodities; Money Stock; Adjusted Monetary Base; St. Louis Adjusted Monetary Base; NAPM: Composite Index; Composite Index of Leading Indicators, 1992=100; University of Michigan: Consumer Sentiment; University of Michigan: Inflation Expectation; Compensation of Employees; Unemployment Rate; and/or Median Duration of Unemployment.

Examples of the types of information specific to the asset that may be input in step 22, in the case that the asset is a share of stock, or is related to the value, return or some other characteristic of a share of stock, include: (i) any of a variety of trading information regarding the stock, such as the stock price, stock trading volume, volatility of the stock price, trading price of options on the stock, information pertaining to analyst recommendations, and/or any of the foregoing information normalized with respect to data for either similar stocks (e.g., stocks in the same sector) or the market as a whole; and/or (ii) any of a variety of information pertaining to the company that issues the stock, such as industry classification, number of employees, any or all of the company's financial information (e.g., book value, amount of debt, debt/equity ratio, amount of profits amount of revenues or types of assets), usage rates of particular raw materials, employee and/or management turnover rates, and/or information pertaining the company's amount and/or type of diversification.

The foregoing macroeconomic, asset-specific (other than the measurement of value of the asset) and/or sector-specific variables are referred to herein as the exogenous variables. In addition, the exogenous variables may include not only financial and economic data (such as those listed above), but any other type of data as well. For example, it is possible to include exogenous variables whose data values pertain to population, climate, popular tastes or sentiments, political environment, current mass media content, and/or any other social, environmental or physical conditions.

Moreover, in addition to inputting actual historic data values, the exogenous variables may include forecasts of any economic or financial data (such as forecasts of any of the above-mentioned data) or even forecasting errors. With respect to forecasts and/or forecast errors, the data value for any forecast or forecast error may be deemed "current" (for purposes of data input) either at the time the forecast is made, as of the date/time with respect to which the forecast is made, or at any other arbitrarily selected time.

In general, it will be desirable that for each time point at which data are entered, current data values for all exogenous variables used should be input. To the extent that current information for any such exogenous variable is not available at any such given point in time, it generally will be preferable to use the most recent data for such exogenous variable. For example, certain economic data may be announced only monthly or only quarterly. If this is the case, the most recently announced data value is used until the next announcement. Particularly in cases where the announcement of any data value is significantly less frequent than the desired frequency of data input (but also in any other cases as well), it may be preferable to include an additional exogenous variable that specifies how current the data value for one of the other exogenous variables is.

In this regard, certain announced data may be indicated as being valid for only a specific previous historical period. For instance, a certain measurement of the unemployment rate for July may not be announced until late August. In such a case, it is preferable to use the announced unemployment rate for all data input times that fall in July. To the extent such unemployment rate information is required for August but is not yet announced, it is preferable to use the announced July rate for all data input times that fall in August (with or without a seasonal adjustment factor), together with an additional exogenous variable that indicates the duration of time since the effective date of the last announcement (e.g., a variable indicating the date in August).

When data are subsequently input for other assets (as described below) much of the data previously input for the exogenous variables may be reused. However, to the extent that different data input times are used for different assets, it might be necessary to input new data values. To the extent that the data input times are identical (or are at least close enough in time that new announcements have not yet been made), the following is a list of the types of data that typically may be reused for different assets: the general economic data; the data that are not related to economic or financial factors; any industry-specific data, provided that two securities are issued by companies in the same industry sector (however defined); and any other data that is not unique to one asset relative to the other.

In the preferred embodiment of the invention, the exogenous variables include only financial, economic and/or other types of data that are not particularly associated with any individual asset, any single class of assets or any single industry but instead affect various assets in various classes and industries. More preferably, the exogenous variables include the specific general economic information listed above. As a result, provided that the data input time points are the same for different assets, once a set of data has been input for the first time, only an indicator of asset value will have to be input for each additional asset.

In step 24, a price formula is determined for the current asset based on the data input for the asset in step 22. The determined price formula relates the indicator of the value of the asset that was input in step 22 to the exogenous variables input in step 22. If Y represents the value of the asset and X represents a vector containing the data values for the exogenous variables that are to be used in estimating Y, then the relationship between Y and X can be expressed as $$Y=f(X)+U \quad (Eq. 1)$$

where U is independent of X and, by including an appropriate constant term in f(X), can be assumed to be zero-mean. As a result, the expected value of Y equals the expected value of f(X), which can be stated algebraically as follows:

$$E\{Y\}=E\{f(X)\} \quad (Eq. 2)$$

Eq. 1 can be expanded, for example, using a Maclaurin series expansion. In the simplest case of such an expansion, in which X consists of a single variable, Y can be expressed as follows:

$$Y=\beta 0+\beta 1*X+\beta 2*X^2+\beta 3*X^3+\ldots+U \quad (Eq. 3)$$

where U is the approximation error and is independent of X. In order to obtain a practical representation of Y, the infinite series represented, by Eq. 3 is truncated. Although Eq. 3 can be truncated at any point, it is presently preferable to truncate Eq. 3 by eliminating all powers of X greater than 2 or 3. As a result, U generally can be assumed to be uncorrelated with X. Eq. 3 above also can easily be modified to express the more general case of a Taylor series expansion.

When X consists of multiple variables $X_i$, the Maclaurin series expansion will include the higher order terms of the various $X_i$ as well as cross-product terms, such as $X_i X_j$. For example, the second order Maclaurin series expansion is given as $$Y = a + \sum_{i=1}^{N} b_i x_i + \sum_{i=1}^{N} \sum_{j=1}^{N} c_{ij} x_i x_j \quad (Eq. 4)$$

where N is the number of exogenous variables $X_i$. In Eq. 4, each $b_i$ is the first order partial derivative of Y with respect to $X_i$ evaluated at the origin, and the $c_{ij}$ are the mixed partial derivatives of Y with respect to $X_i$ and $X_j$ evaluated at the origin. Of course, higher order Maclaurin series expansions are also possible (e.g., third order). In addition, Eq. 4 also can easily be modified to express the more general case of a Taylor series expansion.

In order to determine the price formula for predicting the value of an asset, it is necessary to determine the coefficient values (e.g., in the case of a second order expansion, values for a and for all $b_i$ and $c_{ij}$) in the above-described Maclaurin or Taylor series expansion. Such values can be determined in any of a variety of ways. In one embodiment, the coefficients are calculated using a statistical regression technique, such as by minimizing the total of some function of the error (e.g., magnitude of error or squared error) between each actual data point and the point predicted by the resulting formula. Such techniques are well known in the art and therefore are not discussed in detail here.

Although the preferred embodiment of the invention uses a Taylor series expansion representation for Y, any other predefined parametric equation may used instead, such as a Fourier series expansion or similar frequency-space transformation. In any event, the parameters for any such predefined parametric equation generally can be determined in a similar manner to that described above, e.g., minimizing the total of some function of error.

As a still further alternative, it is possible to determine a price formula where the format of the equation is not pre-defined, but rather determined dynamically based on the input data. The preferred method for implementing such a solution is to use a neural network technique. As is well known in the art, neural networks typically operate by propagating data throughout a network of nodes, with a weight applied to each data element as it propagates from one given node to another given node.

The neural network is trained to produce the correct response by inputting sample input-output pairs, observing the system's actual output in response to the sample input, and comparing such actual outputs to the provided sample outputs. The training algorithm then adjusts the weights between the nodes, and may even create and/or delete nodes, based on the results of the comparison. Any of numerous different training algorithms may be used, such as a genetic algorithm. Also, by restricting creation and deletion of nodes, a neural network may also be used to identify coefficients in the above-described simpler case of a predefined parametric equation.

In the present case, such a neural network is trained using the data input in step 22 to provide the appropriate price (or other measurement of value) for the asset as a function of the data values for the exogenous variables. Once training has been completed using such data, the structure and weighting coefficients of the neural network are fixed and define a formula that provides an estimate for the value of the asset in response to an input of any data values for the set of exogenous variables.

In the examples given above, the price formula expresses the actual value of the price (or other measure of value) of the subject asset as a function of the actual data values for the exogenous variables. Such a formulation lends itself will to determining the sensitivity of Y to each variable making up X (i.e., $X_i$) because in this case the partial derivative of Y with respect to $X_i$ gives the sensitivity of the value of the asset to the exogenous variable corresponding to $X_i$. However, in the preferred embodiment of the invention, the price formula is expresses a logarithm of the value of an asset as a function of logarithms of the exogenous variables. In this alternative formulation, the partial derivative of Y with respect to $X_i$ gives the elasticity of the value of the asset to the exogenous variable corresponding to $X_i$.

Also, in calculating the price formula as described above, it is possible to treat all data points equally. Alternatively, it may instead be preferable to weight more recent observations more heavily than those observations that are more remote in time. In addition, as both the measure of the subject asset's value and the data values for the exogenous that are used typically will only be estimates of the actual values and data values, respectively, in certain cases it may be preferable to more heavily weight those observations that are known with more certainty (e.g., lower variance).

In step 26, a determination is made as to whether price formulas have been calculated (in step 24) for all of the assets of interest. It is noted that it may be desirable to perform step 24 for all assets for which data have been input (i.e., all assets in the tool's database) or for only the subset of such assets that are of interest to the current user. If the determination in step 26 is affirmative, processing proceeds to step 30. If not, processing proceeds to step 28 to input historical data (preferably reusing previously input data to the extent possible, as discussed above) for the next asset and to calculate a price formula for that asset in step 24.

In step 30, values for the exogenous variables, collectively comprising a particular scenario, are input. Typically, a user will manually input such a scenario. However, some or all of the data values comprising the scenario may be generated automatically, such as may be provided by a separate forecasting system, e.g., using any of the techniques described in commonly assigned U.S. patent application Ser. Nos. 09/392,361, 09/391,765, 09/392,109, 09/391,962, 09/391,534, 09/392,106, or 09/391,764, filed Sep. 8, 1999, or 09/494,200, filed Jan. 28, 2000, all of which are incorporated herein by reference as though set forth herein in full.

There are many different techniques for inputting a scenario. For example, in one embodiment of the invention, a data value for each variable is separately input. In an alternative embodiment, default values have already been entered for the exogenous variables, and therefore it is only necessary to replace those default values as desired. Preferably, the default data value for each exogenous variable (i.e., the data value to be used if no other data value is provided for such variable) is the most currently available data value for the variable. In a still further embodiment, only changes in the default values are required to be input, with the default change value being zero. It is noted that such changes may be input as either the actual expected difference from the default value or as the expected percentage change in the default value. Still further, it is possible to give the user the option as to which input method to use Regardless of how the scenario is initially input, the tool according to the present invention preferably converts such inputs into a complete set of data values for the exogenous variables for use in the processing described below.

Due to the interrelationships among the exogenous variables, when a change in a data value for one of the exogenous variables is input, it may be preferable in certain embodiments of the invention to automatically account for the changes expected in the other exogenous variables as a result of such input change. More details regarding such a feature and the tradeoffs pertaining to incorporating such a feature are described in connection with the discussion of step 34 below.

In step 32, the value of each asset under consideration is determined, preferably by plugging the data values for the exogenous variables input in step 30 into the price formula for such asset calculated in step 24. The price formula typically can be calculated in a straightforward manner by replacing the exogenous variables with the corresponding scenario data values and then calculating the result of the formula. In an embodiment in which a neural network (or similar network-based solution) is used, the data values for the exogenous variables typically can be provided as the inputs to the network, with the network output being the asset value estimate.

In step 34, the tendency(ies) of one or more of the asset value(s) to change as a result of change(s) in one or more of the exogenous variables are calculated, based on the input scenario. Preferably, such tendencies will be sensitivities and/or elasticities of the value of the asset to one or more of the exogenous variables. However, any other measures of tendency to change may instead (or also) be calculated.

Ordinarily, in the case where a predefined parametric equation is used, these calculations will mainly involve taking or estimating partial derivatives of the price function with respect to the exogenous variables of interest. In particular, when the price formula is determined from a pre-defined parametric equation, a closed-form solution for each such partial derivative often can be determined in advance and then stored. For instance, assume that Y is given as a second order polynomial function of X, that X consists of only two variables, $X_1$ and $X_2$, and that Y represents the actual value of the asset and the $X_i$ represent the actual data values for the exogenous variables. In this case, the sensitivity of Y to $X_1$ is found by taking the partial derivative of Y (as expressed in Eq. 4 above) with respect to $X_1$ and therefore is given as:

$$\partial y/\partial x_1 = b_1 + b_2(\partial x_2/\partial x_1) + c_{12}x_2 + c_{12}x_1(\partial x_2/\partial x_1) + 2c_{11}x_1 + 2c_{22}x_2(\partial x_2/\partial x_1) \quad \text{(Eq. 5)}$$

In Eq. 5, the b and c coefficients were determined in step 24 and the values for $X_1$ and $X_2$ were input in step 30. The only remaining value to be supplied is the partial derivative of $X_2$ with respect to $X_1$. This value can be assumed to be zero if $X_1$ and $X_2$ are known to be largely independent of each other or subject to the considerations described below, may be arbitrarily assumed to be zero. Otherwise, the relationship between $X_1$ and $X_2$ can be determined by performing a linear or non-linear regression technique using historical data for the two corresponding exogenous variables, by performing a neural network technique using such data to train the network, or in any other manner. Regardless of which technique is used, it is preferable also to evaluate the statistical significance of the correlation between $X_1$ and $X_2$ and then to assume that $dX_2/dX_1$ is zero if such statistical significance is less than a specified (e.g., predetermined) threshold.

In general, in order to obtain a closed-form solution of each partial derivative of any price formula that is expressed as a polynomial expansion, it typically will be necessary to either (i) evaluate the partial derivative of each exogenous variable with respect to each other exogenous variable and also to evaluate the statistical significance of each such partial derivative; or (ii) assume that such partial derivatives are equal to zero.

In certain cases, a closed-form solution of the partial derivatives cannot easily be obtained. For example, this situation is likely to occur when a neural network is utilized or even in certain cases involving more complicated pre-defined parametric equations. In such cases, it is possible to obtain an estimate of the instantaneous derivative directly from the price formula obtained in step 24. In one example, such an estimate is obtained by observing the value of the asset calculated in step 24 using the scenario input in step 22, slightly changing the data value of one of the exogenous variables (e.g., by 1% of its previous value), and then calculating the change in the asset's value divided by the change in the data value for the exogenous variable.

On the other hand, recognizing that a change in one exogenous variable might correlate with changes in one or more other exogenous variables, an alternative embodiment of the present invention estimates the instantaneous derivative of the price formula in such cases by taking into account any changes that are likely to occur in the other exogenous variables as a result of the small change in the one exogenous variable. To accomplish this, in one embodiment of the present invention the partial derivative (e.g., sensitivity) of each exogenous variable with respect to each other exogenous variable and the statistical significance of each such partial derivative are calculated, such as described above. Then, the effect of a slight change in the data value of one of the exogenous on the data values of the other exogenous variables can be readily calculated. Accordingly, the calculated changes in such other exogenous variables are applied, as well as the change in the data value for the subject exogenous variable, and the resulting new set of data values is input into the network (or plugged into the price formula) to calculate a new value for the asset. By dividing the change in the asset value by the change in the data value for the subject exogenous variable, it may be possible to obtain a more complete measure of the tendency of the asset value to change as a result of a change in a particular one of the exogenous variables.

As indicated above, two distinct approaches exist for determining the tendency of an asset value to change as the result of a change in the data value for an exogenous variable. In the first approach, the sensitivity of each exogenous variable to each other exogenous variable is ignored (i.e., the exogenous variables are treated as being independent). In the second approach, the sensitivities of the exogenous variables to each other are taken fully into account in determining the tendency of the asset value to change as a result of a change in one of the exogenous variables. The particular approach selected typically will depend upon the needs of the user.

With the first approach, the user generally will be required to account for correlations between the exogenous variables in some other way, such as in connection with subsequent processing of the various price sensitivities, elasticities or other measurements of tendency to change. On the other hand, with the second approach, in subsequent processing the user typically must recognize that certain changes in the exogenous variables have been automatically anticipated; therefore, such subsequent processing: (i) generally must attempt, for each exogenous variable, to estimate only that portion of the change that would not have been predicted by previously entered changes in the other exogenous variables; and (ii) may be required, in certain circumstances, to back out redundantly reflected relationships among the exogenous variables.

It should be noted that similar considerations and tradeoffs in determining whether to reflect expected changes in related exogenous variables may also be made in connection with the inputting the various projected scenarios in step 30 (discussed above). Also, it is possible to make either option available to the user (which options may be made available independently for steps 30 and 34) and let the user select the appropriate option to use for each application (e.g., by selecting a corresponding configuration setting).

As noted above, in the event that the price formula obtained in step 24 relates actual value of the asset to actual data values for the exogenous variables (i.e., Y represents the value of the asset and $X_i$ represents the data value of the corresponding exogenous variable), then simply estimating a partial derivative of Y with respect to $X_i$ will provide the sensitivity of the asset value to such exogenous variable. Obtaining the elasticity of the asset value to such exogenous variable in this case will require calculating $(X_i/Y)*(dY/dX_i)$. On the other hand, if the price formula obtained in step 24 relates the logarithm of the asset value to the logarithms of the data values for the exogenous variables (i.e., Y represents a logarithm of the value of the asset and $X_i$ represents a logarithm of the data value of the corresponding exogenous variable), then simply estimating a partial derivative of Y with respect to $X_i$ will provide the elasticity of the asset value to such exogenous variable.

In step 36, any desired asset screening is performed. According to the present invention, such screening can be based on the scenario-based estimates of asset values and/or tendencies of the asset values to change in response to changes in the exogenous variables (e.g., sensitivities or elasticities), calculated above, instead of or in addition to the factors conventionally used for screening stocks and other assets.

For example, a user may in step 30 input a scenario in which the unemployment rate, inflation rate and the price of crude oil change in specific amounts, but all other exogenous variables remain at their default values (or, depending upon the system configuration and possibly the option settings selected by the user, change in the amounts expected based on the changes specified for those three exogenous variables). After steps 32 and 34 have completed for all assets desired to be searched, the user may then in step 36 search for all stocks that have increased in value by at least a specified percentage and that have price elasticities to the Japanese exchange rate and to Gross National Product that are within a specified range. The user may further limit the search to only those stocks issued by companies that have fewer than 500 employees. In fact, assets can be screened in this manner based on any combination of projected asset value under the specified scenario, sensitivity or elasticity to any exogenous variable(s) given the specified scenario, and/or any other information that has been input or derived for assets in the database (e.g., any of the information conventionally used for asset screening).

It is noted that it is not necessary to calculate a value for each asset in step 32 and a tendency of asset value to change for each asset with respect to each exogenous variable in step 34. Rather, steps 32 and 34 may instead be performed only to the extent needed in connection with a user's analysis of particular assets or in connection with screening over an identified group of assets. For example, it may be more efficient in the example given above to first identify those companies that have fewer than 500 employees in the database and then calculate the asset values in step 32 only for those companies and calculate tendencies of the asset values to change in step 34 only for those companies and only with respect to the Japanese exchange rate and to the Gross National Product.

In step 37, the user's holdings are adjusted based on the results of the analysis in steps 32 and/or 34 and/or based on the screening in step 36. For example, after determining a projected value and projected elasticities for an individual stock based on an input scenario, a user may decide to sell some or all of the stock, short sell the stock, purchase the stock, purchase or sell an option on the stock, purchase or sell another derivative instrument whose value is based on a characteristic of the stock, and/or initiate any other purchase, sale or other economic transaction to meet the user's financial goals. Such decisions may be (i) made solely by the user based on the above-described information provided by the evaluation/screening tool of the present invention; (ii) recommended to the user by the evaluation/screening tool by including within the tool capabilities for a user to input the user's financial goals and process steps for automatically screening stocks and/or other financial assets to attain those financial goals (which recommendations may be provided by the evaluation/screening tool to the user with or without the underlying data on which such recommendations were made); and/or (iii) performed automatically by the evaluation/screening tool without user input after evaluating the user's financial goals and performing any indicated screening (e.g., according to predetermined process steps).

Options (ii) and (iii) above require the evaluation/screening tool of the present invention to include additional analytical functionality, typically directed toward making the tool more user-friendly. However, such functionality generally is relatively straightforward to implement. For instance, assume that a user has indicated that he wants to maximize growth within a specified time horizon, subject to the condition that risk should be limited with respect to certain specified exogenous variables. In this case, the tool preferably would search the stocks in the database and sort such stocks into groups having negative, positive and approximately zero elasticities to each of the exogenous variables; calculate the expected returns to each such stock; and then construct a portfolio, possibly using an iterative technique, that balances the elasticities to within the specified limits while achieving the maximum possible return. Depending upon whether option (ii) or option (iii) is being implemented, the resulting trades required to achieve that portfolio are then either recommended to the user or initiated automatically by the tool. The process steps which determine which trades to make may also be supplemented to account for tax implications and/or trading costs.

Although step 37 is shown in FIG. 1 and discussed above as being performed after step 36, it should be understood that step 37 may also or instead be performed at various points in the process, such as immediately after step 32 or immediately after step 34.

In step 38, a determination is made as to whether any additional scenarios need to be tested. In the preferred embodiment of the invention, the user simply indicates whether or not he or she would like to input another scenario. However, if the tool according to the present invention is incorporated into a more extensive financial or economic analysis system, another program or system might provide this indication. If analysis of an additional scenario is desired, then processing returns to step 30 to input data values for the exogenous variables. If not, then processing proceeds to step 40.

In step 40, a determination is made as to whether the model needs to be updated. In the preferred embodiment of the invention, the price formulas are recalculated periodically using historical data over a rolling period of time. For example, the price formula may be generated using data over the past three years and recalculated each business day. When it is time to update the model, processing returns to step 22 to input historical data for the first asset, together with historical data values for the contemporaneous exogenous variables. When step 22 is being repeated, as contrasted with the first time the entire process is executed, it generally is not necessary to input the entire data set. Rather, only the new data generally need to be added and the old data (outside the rolling period) deleted from the data set upon which the price formula is calculated. In addition, weights may be reassigned to reflect the relative recency of each data entry in the thus newly formed data set.

Figure 2:
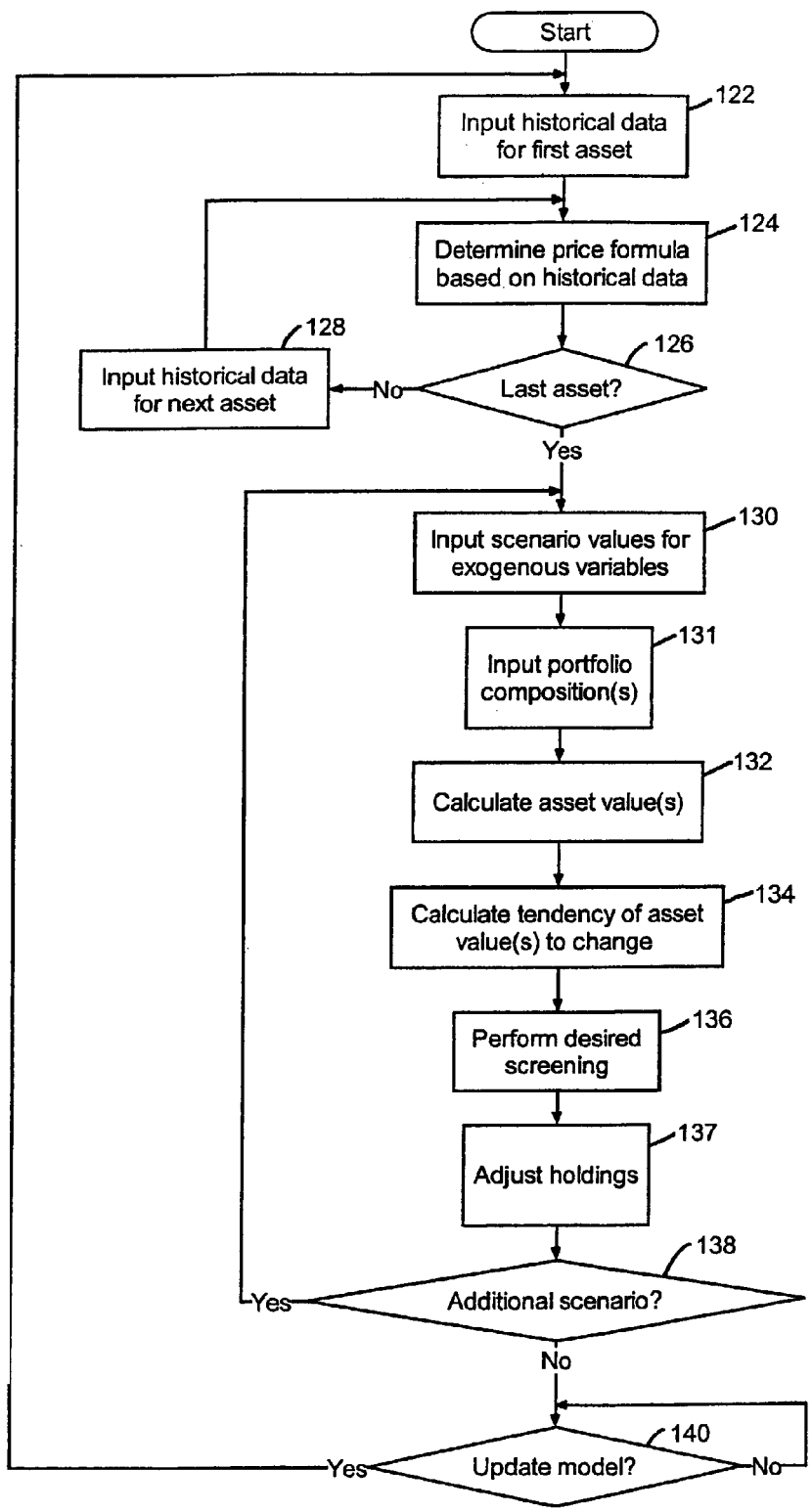
FIG. 2 is a flow diagram for explaining portfolio evaluation and screening according to a representative embodiment of the invention.

FIG. 2 illustrates a flow diagram for evaluating/screening portfolios according to a representative embodiment of the present invention. In general, much of the processing for evaluating/screening portfolios will be similar to that used for analyzing/screening individual assets, but with certain additional functionality. In fact, in the embodiment described below, both types of functionality are provided.

In step 122, historical data for a first asset are input. This step is essentially identical to step 22 described above.

In step 124, a price formula is determined for the current asset. This step is essentially identical to step 24 described above.

In step 126, a determination is made as to whether a price formula has been calculated for the last asset to be processed. As with step 26, discussed above, step 124, may be performed for all assets for which data have been input or only a subset of such assets that are of interest to the current user. If the determination is affirmative, processing proceeds to step 130. If not, processing proceeds to step 128 to input historical data (preferably reusing previously input data to the extent possible, as discussed above) for the next asset and to calculate a price formula for that asset in step 124.

Steps 128 and 130 are essentially identical to steps 28 and 30, respectively, as such steps are described above.

In step 131, composition information is input for one or more portfolios of interest. Preferably, the input portfolio composition information includes the type and quantity of each asset (e.g., type of stock and number of shares). Such information may be input directly by a human user via a user interface (e.g., a graphical user interface) or may be input by another computer program or system operating in conjunction with the asset evaluation/screening tool of the present invention.

In step 132, asset values are calculated. With respect to individual assets, such as individual stocks or individual commodities, this step is essentially identical to step 32 described above. However, in addition to allowing the user to obtain the value of individual assets, in this embodiment of the invention step 132 also allows the user to obtain the value of the portfolios defined in step 131 under the scenario input in step 130. Such a portfolio value preferably is obtained by summing the values of the assets included within the subject portfolio.

In step 134, the tendencies of asset values to change in response to changes in the exogenous variables are calculated. With respect to individual assets, such as individual stocks or individual commodities, this step is essentially identical to step 34 described above. However, in addition to allowing the user to obtain measures of the tendencies of the values of individual assets to change, in this embodiment of the invention step 134 also allows the user to obtain similar measures for the portfolios defined in step 131 under the scenario input in step 130. Such a measure for the portfolio preferably is obtained by performing a weighted average of the corresponding measures for the assets included within the subject portfolio.

In step 136, any desired screening is performed. With respect to individual assets, such as individual stocks or individual commodities, this step is essentially identical to step 36 described above. However, this step preferably allows the user to search from among different portfolios as well as different individual assets, using any of the screening criteria described above for individual assets.

In step 137, adjustments in the user's holdings are made based on the evaluation/screening data provided by steps 132, 134 and/or 136. This step is essentially identical to step 37 described above, but extended to include more portfolio-related transactions. Thus, a user may be allowed to supplement or modify the user's existing portfolio(s) or create one or more additional portfolios. As noted above, such actions can be fully automated or can be implemented with varying levels of participation from the user.

In step 138, a determination is made as to whether an additional scenario is required to be analyzed. This step is essentially identical to step 38 described above. However, here the user has the option to alter not only the data values for the exogenous variables but also the composition of one or more portfolios. As a result, the user is provided with significant flexibility to project how various changes in his or her portfolio, as well as changes in external conditions, will affect the portfolio's value and/or the portfolio's exposures to various specific risks.

Finally, in step 140 a determination is made as to whether the model needs to be updated. This step and the considerations pertaining thereto are essentially identical to step 40 described above. If the model does need to be updated, processing returns to step 122.

In the foregoing embodiments of the invention, a price formula is calculated based on historical data for values for of an asset and historical data values for a number of exogenous variables, and then a measure of the tendency of the asset value to change as a result of changes in the exogenous variables is calculated from that price formula. It should be noted that it is also possible to directly calculate a return formula that expresses changes in the value of the asset as a function of changes in the data values for the exogenous variables. For instance, by initially inputting data values corresponding to changes in the value of the asset (e.g., either actual quantity changes or percentage changes) over some period of time (preferably a rolling period of time) and changes in the exogenous variables (e.g., quantity changes or percentage changes) over the same period of time, a return formula that relates such price changes to such changes in the exogenous variables can be obtained, using either a linear or non-linear regression or a neural network technique, in a similar manner to that described above.

It is also possible to calculate the price or return formulas, and corresponding measures of tendency of asset value to change based on the exogenous variables, separately in different environments. For instance, it is possible to calculate one price formula using only data for periods of increasing inflation rates and another price formula calculated using only data for periods of decreasing inflation rates. In this way, for instance, it can be determined whether the elasticities of the asset values to inflation rates are symmetric (i.e., the same during periods of rising inflation as during periods of declining inflation) or, if not, how they differ. Alternatively, similar information could be obtained by including an additional variable that indicates the change in the rate of inflation. Such an additional variable could be binary (i.e., indicating either increasing or decreasing inflation rates) or could indicate the change in the inflation rate (either in terms of the quantity change in the inflation rate or in terms of the percentage change in the rate).

In addition to determining different environments in the foregoing deterministic manner, it also may be preferable, in certain circumstances, to dynamically define the different environments for which separate models are to be generated. For instance, after collecting historical data over the three previous years, such data may be subject to statistical cluster analysis (as described in more detail below). The resulting clusters may then be interpreted as distinct economic environments, for which different price or return models may be generated. The subsequent scenario-based processing will then use the model corresponding to the environment in which the input scenario falls. Utilizing separate scenarios in this fashion often may provide more accurate prediction and estimation results, because each model can be separately tailored to a unique environment and also because, at least in the case of a Taylor or Maclaurin series expansion, the dispersion of the historical data points around the expansion point often can be significantly reduced. It is noted that, generally, each such expansion point will be located at or near the center of the corresponding environment.

In this latter regard, it is noted that the location of the expansion point for a Taylor or Maclaurin series expansion generally will affect the accuracy of the resulting model. In addition to locating the expansion points as indicated above, the expansion point may be located at, or otherwise based on, the input scenario. Similarly, the expansion point may be located at, or otherwise based on, an independently generated prediction of the future environment, such as using a prediction made in accordance with any of the techniques described in co-pending application Ser. Nos. 09/392,361, 09/391,765, 09/392,109, 09/391,962, 09/391,534, 09/392,106, or 09/391,764, filed Sep. 8, 1999, or 09/494,200, filed Jan. 28, 2000.

By using a large number of exogenous variables (e.g., at least 30 to 50) the price formulas (or return formulas) of the present invention often can approximate the reduced form of the actual value of (or return to) the asset, whatever that form may happen to be. As a result, it is preferable to use such a large number of variables in the technique of the present invention. Currently, it is most preferable to use approximately 35 exogenous variables.

The above discussion frequently refers to the "value" of an asset. Generally, the value of an asset will be the price at which it is traded. However, other measurements of value may be used in addition to or in place of selling price. Such other measurements may be of particular importance, for example, when the subject asset is thinly traded, the subject asset frequently is traded in combination with other assets, or there exists any other factor that makes selling price an inappropriate indicator of the asset's value. As used herein, an "asset" may refer to a stock, a commodity, an index, a mutual fund, a derivative instrument whose value is based on the value, or on some other characteristic, of any of the foregoing, or any other item of value.

The issue of statistical significance of the estimated measures of tendencies of the asset values to change based on changes in the exogenous variables is important. There may be numerous instances where there is no statistical significance to the estimated price formula and, consequently, no statistical significance to the estimated measure of tendency to change.

One approach to this problem is to use a statistical significance threshold (e.g., as part of any screening). The statistical significance of each coefficient can be tested using Student's t-test. Similarly, the statistical significance of groups of coefficients can be tested using the f-test. With respect to the latter, a number of groups may be defined, each group corresponding to a single exogenous variable and including the coefficients associated with all terms that include that exogenous variable. It is noted that in this example, if a second or higher order Taylor series expansion had been used, the existence of cross-product terms will mean that the defined groups will overlap.

Alternatively, the group may include all coefficients used in the price formula. Then, any asset for which the identified coefficients have insufficient statistical significance (e.g., a p value exceeding some threshold, such as 5% significance) preferably would be excluded from the candidate pool for screening and generally would not be used for most other purposes in which the asset would be considered individually. However, in certain cases where aggregate statistics are to be calculated across multiple assets, the data for such an asset may be useful.

In the foregoing estimation of statistical significance, the p value associated with any given t-test or f-test can be estimated with reference to a specified confidence interval for each of the subject coefficients. Alternatively, such confidence interval(s) can be specified and then the p value associated with such confidence interval(s) can be determined. For instance, it is possible to specify a confidence interval of ±5% for each coefficient (i.e., for each coefficient, the interval from 95% to 105% of the estimated value for such coefficient) and then determine the p value associated with such interval(s) (i.e., the probability that any of such coefficients is outside of the ±5% confidence interval for its estimated value). Typically, such a probability will not be constant, but rather will depend upon the particular scenario (i.e., the input data values for the set of exogenous variables). For instance, the p value generally be significantly higher within a region of the exogenous variable space in which relatively little of the historical data used in creating the underlying model is located than in other regions where more such historical data points were located. Similarly, for a specified p value, the width of the confidence intervals typically will depend upon the particular scenario, with wider intervals tending to occur in regions of the exogenous variable space in which there was relatively little historical data input in step 122.

It is noted that the f-test can be applied to the price formula to determine the statistical significance of the value estimate or to the partial derivatives of the price formula to determine the statistical significance of the sensitivity, elasticity or similar measure. In the event that the f-test is applied to all coefficients in a formula, one can obtain a p value that corresponds to a specified confidence interval for the endogenous variable or, alternatively, a confidence interval for a specified p value. Thus, it is possible to calculate a p value for value of an asset within a specified confidence interval, a p value for a measure of the tendency of an asset value to change within a specified confidence interval, or corresponding confidence intervals given specified p values.

In addition to evaluation and screening based on a single scenario, the present invention also contemplates evaluating and screening based on multiple different scenarios. For instance, the user may input a range of data values for one or more of the exogenous variables. In this case, the evaluation/screening tool of the present invention preferably samples the data values within each such range and combines the sampled data values to provide multiple different scenarios. After calculating asset values and tendencies of asset-values to change for each such scenario, the evaluation/screening tool may output a range of asset values and a range of elasticities (or similar measures) for each asset. Such information may then be used as the basis for screening criteria.

As will be observed from the above discussion, the asset evaluation/screening tool of the present invention can provide a user with a variety of information that can be directly used to maximize the value of the user's portfolio, while limiting the user's exposure to particular risk. For example, the user can alter the mix of his or her portfolio, input a projected scenario, view how the portfolio value and exposure to specific risks changes based on that projected scenario, search for optimal assets or combinations of assets under specified criteria, and then repeat this process for different portfolio compositions, different scenarios and/or different financial and economic criteria or goals.

Significance-Based Display.

Once data have been generated by the evaluation/screening tool of the present invention, it often will be desirable to display some or all of such data to the end user. For example, it may be desirable to display data concerning the elasticities of various assets to the rate of inflation during a given scenario. Conventionally, information may be displayed in several different ways. For instance, it is possible to display such information in a tabular format or in a graphical format. In the evaluation/screening tool of the present invention, due to the large amount of information that must be presented simultaneously, it is preferable to display at least some of the information graphically.

For instance, the elasticity data in the above example preferably is displayed in a bar graph format, with each different asset corresponding to a point on the x axis and the elasticity for each asset being represented by a bar whose height corresponds to the magnitude of the elasticity, and with the bar originating at y=0 and extending upward for positive elasticity and downward for negative elasticity. In addition to indicating the magnitude and direction of the elasticity for each asset, the display according to the preferred embodiment of the present invention also indicates the statistical significance of the elasticity for each asset. More preferably, the intensity at which the bar for each asset is displayed preferably is a function of the statistical significance of the calculated elasticity for that asset. Such a display is illustrated in FIG. 3.

Figure 3:
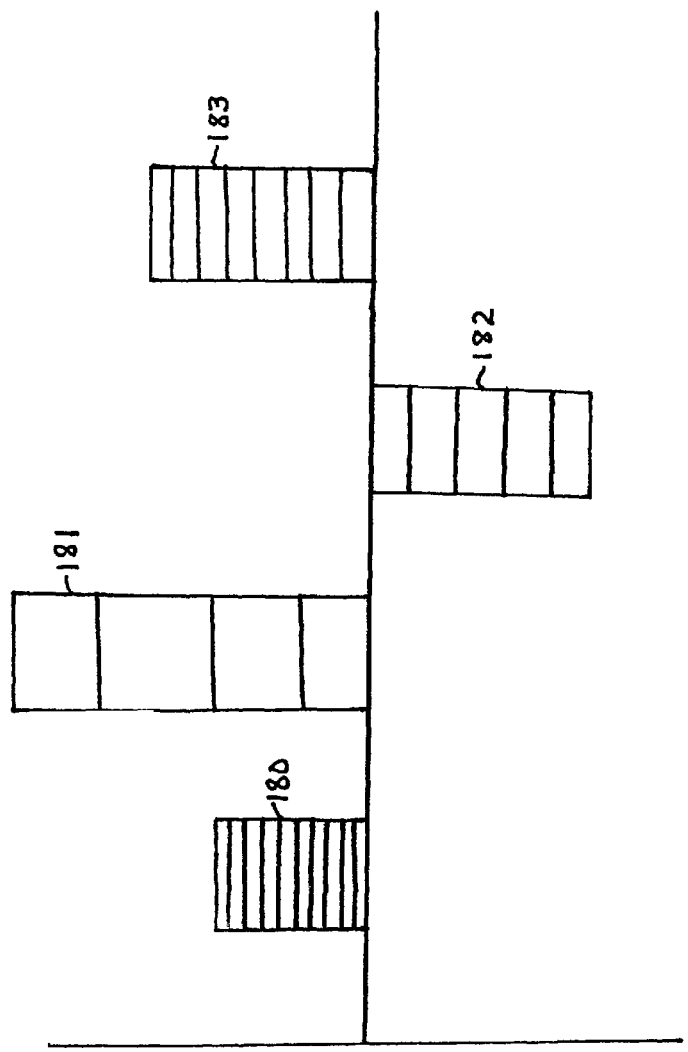
FIG. 3 illustrates display of asset elasticity information according to a representative embodiment of the present invention.

Specifically, FIG. 3 illustrates a bar graph according to the present invention. In FIG. 3, each bar corresponds to a different asset (e.g., stock) and the height (or length) of the bar is proportional to the asset's elasticity to a specified exogenous variable (e.g., the Federal Funds Rate). It should be noted that the height of each bar may instead be any other function of the elasticity for the corresponding asset, although preferably that function is the same for all assets that are displayed at the same time. Also, although elasticities for various assets are displayed in FIG. 3, any other measure of a tendency of an asset's value to change based on a change in an exogenous variable may instead be displayed. For simplicity, the following discussion will continue to refer to elasticities, it being understood any other such measure of tendency to change may be substituted therefor.

As discussed above, the statistical significance for each elasticity calculation can be determined, such as by applying the f-test to the coefficients of the elasticity formula, which in turn may be derived from the price formula. The resulting p value provides a measure of the statistical significance of the calculated elasticity. As also noted above, the p value may be tied to a confidence interval for the determined elasticity or to a set of confidence intervals for the coefficients used in the elasticity formula. Similarly, the p value may be dependent upon the point in the exogenous variable space (i.e., the particular input scenario). In the preferred embodiment of the invention, the p values are calculated with respect to similar confidence intervals across all assets to be displayed and at the same input scenario, such that comparisons between the p values will be meaningful.

The bars 180 to 183 in FIG. 3 reflect the different statistical significances of the different assets by being displayed in different intensities, the intensity of each such bar being a function of the statistical significance of the corresponding asset. For instance, the intensity at which a bar is displayed might be equal to 1 minus the p value for the corresponding asset, where intensity ranges from 0 (meaning that the bar is not displayed at all) to 1 (meaning maximum intensity). In FIG. 3, intensity is illustrated by the density of the horizontal lines within a bar. Thus, bar 180 is displayed at a high intensity, indicating that the calculated elasticity of the corresponding asset is highly statistically significant (e.g., a p value of 0.05). By contrast, bar 181 is displayed very lightly, indicating a very low statistical significance (e.g., a p value of 0.90). Between these extremes are bars 182 and 183, which indicate intermediate levels of statistical significance.

Using such a linear relationship between display intensity and statistical significance may be desirable in certain embodiments. However, in other embodiments it may be more desirable to highlight certain differences more than others. For instance, if one is only interested in very significant data, it may be more desirable to non-linearly map the p value (or other measure of statistical significance) to intensity such that more intensity levels are used in the high end of statistical significance (e.g., around p values near 0) than at the low end of statistical significance (e.g., around p values near 1).

Also, although a bar graph is utilized in the foregoing example, it should be understood that the technique of varying display intensity levels based on the statistical significance of the data being displayed can be beneficially used in other graphical display methods as well. Such other graphical display methods include simply plotting individual data points on a graph, graphical techniques in which a line or curve is interpolated between each adjacent pair of data points so as to indicate a continuously changing endogenous variable, and any other graphical display method. Similarly, such techniques may be applied in any other situation where data to be displayed have been estimated and have an associated statistical significance. The actual measure of statistical significance preferably depends upon the type of data to be displayed, and may include, for example, standard deviation, variance, correlation coefficient, and/or any function of the foregoing, in addition to p value.

The variation in display intensity required for the present invention can be accomplished using known techniques. When using a display device having variable intensity, such as a cathode ray tube (CRT) display, the required intensity is simply specified for each display point. When using a monochrome display device, such as certain liquid crystal displays or many printing techniques, the appearance of varying intensity can be provided by using halftoning, error diffusion or other known techniques.

As indicated above, in the preferred embodiments of the invention, statistical significance is displayed by changing the intensity of the displayed data points as a function of their statistical significance. However, it is also possible to graphically indicate statistical significance in other ways as well, including other ways in which statistical significance is indicated without requiring a separate coordinate for it on the graph. For instance one could vary the size of a displayed data point, the width of each bar in a bar graph, or the width of line and/or curve segments in a chart graph as a function of the statistical significance of the corresponding data points. Alternatively, one could vary the hue, saturation, brightness or any other display characteristic of the displayed points as a function of statistical significance. For example, colors at the red end of the color spectrum might indicate low statistical significance while colors at the violet end of the color spectrum would indicate high statistical significance, or vice versa. As used herein, "display characteristic" is intended to mean the way in which a data point is displayed, rather than the position at which it is displayed. With any of such alternate display techniques, as well as the preferred intensity-based technique, the display characteristic (e.g., size, width or color property) may be related to the statistical significance by any linear or non-linear function.

Identifying Industry Sectors Using Clusterization.

Once asset sensitivities, elasticities or other measures of tendency to change with respect to a number of different exogenous variables have been calculated, such as pursuant to the techniques described above, such measures can then be used to identify true industry sectors using conventional clusterization techniques. For example, assume that there exists a collection of stocks, such as several hundred or several thousand different stocks, that are to be assigned to industry sectors. Assume further that elasticities have been calculated for each such stock with respect to each of a number of different exogenous variables (e.g., between 30 and 50 such variables). In order to initially simplify the discussion, it is also assumed that the elasticities of each asset value to each exogenous variable is constant, such as may have been obtained by performing a multi-variate linear regression. In such a case, utilizing cluster analysis, a standard statistical grouping method, in an innovative manner, the present invention is able to identify relevant sectors and simultaneously assign the various stocks into those sectors. Accordingly, the problems with conventional sectoral analysis, sectoral definition and asset classification, are solved simultaneously.

Cluster analysis algorithms (such as are available in Systat and numerous other multi-variate statistics computer programs) attempt to group the data into clusters such that the measured distance between individual data points within each cluster is a minimum, but also such that the measured distance between any two clusters is maximized. In other words, cluster analysis attempts to group data points so that the groups are as much alike as they can reasonably be, but also so the groups are as reasonably different from other groups as they can be. There are numerous standard methods for clustering data which could be employed, including: discrimination functions, factor analysis, and grouping techniques such as iterated Chi-Square and maximum-distance measures.

A preferred embodiment of the invention uses the KMEANS statistical procedure, included in statistical packages such as SYSTAT and the S+ statistical modeling language. The KMEANS algorithm splits N assets into groups by maximizing the between-group distance and minimizing the within-group distance. It is noted that there are numerous possible distance measures which could be used, such as Pearson Product Moment Correlation, Sum of Squared Deviations, and Rsquared (1−Squared Pearson Product Moment Correlation), or the Minkowski distance, the z-th root of the mean z-th powered coordinate distance, e.g., with an initial parameter z=2.

The cluster analysis of the present invention may be performed over the entire set of exogenous variables or over any subset thereof. By defining each resulting cluster to be a sector, the present invention automatically provides sector definitions. Moreover, because the sectors are formed by clustering assets having similar elasticities (or other measures of tendency to change based on changes in the exogenous variables), it is more likely than in conventional techniques that the stocks in each sector do in fact respond similarly to market conditions or, more accurately, to the set of conditions represented by the exogenous variables used.

After having obtained sectors and sector assignments in this manner, aggregate statistics for each sector can be calculated and monitored over time in order to assess changes in various industries and to utilize such changes to predict changes in other industries, as well as in various macroeconomic data. Such aggregate statistics might include, for example, total gross revenues, total profits, total employment, average profit margin, total market capitalization, total inventory as well as changes in the foregoing data. Based on the predictions derived from such data, assets may be purchased or sold. For instance, declining profitability and increasing inventory in a sector that includes a significant number of computer hardware manufacturers might signal a future decrease in demand for computer chips, prompting one to sell stock in computer chip manufacturers.

Preferably, the elasticities for the stocks in the current example will have been determined by using data over some fixed interval of time. By recalculating such elasticities on a rolling basis, one can observe how assets move both relative to their clusters and among clusters overtime. Any such changes might signal, for example, a change in the direction or management of the underlying company, a change in a company's methods or technology that is making that company's business more or less dependent on a particular input to production (e.g., a particular type of labor or raw materials), or even a diversification by the company into other types of business that are affected by different conditions. In addition, one may observe how the sector definitions themselves change over time, indicating potential changes in an entire industry.

In a somewhat more complicated example, assume that the elasticities (or other measures of tendency of asset value to change as of result of changes in the exogenous variables) are expressed as a function of the exogenous variables. This generally will be the case, for example, where the price function or return function has been determined using a non-linear regression or a neural network technique. In this case, the assets can be clustered using the foregoing technique and inputting current data values for the exogenous variables (i.e., using the current scenario). Alternatively, the assets might be clustered over multiple scenarios, such as by sampling the elasticities using such multiple scenarios and then clustering on the basis of all resulting data. Such multiple scenarios might be selected, for example, to include the current scenario and group of scenarios in the neighborhood of the current scenario. Still further, separate clustering might be performed for each such separate scenario and then the resulting sectors compared across different scenarios. Also, as with the example described above, the sectors may be recomputed on a rolling basis and changes in both the assets and the sector definitions observed over time.

The various techniques described above may be used in any or all possible combinations, depending upon the data needs of the end user. Common to all such embodiments, however, is the grouping of assets based on similarities of their tendencies to change in value as the result of changes in a set of exogenous variables. The most common application of this aspect of the invention is for use in defining business sectors and for classifying stocks into those sectors. However, the techniques described above may be used on connection with any other types of assets as well. By grouping assets in this manner, the present invention provides the basis for predicting future changes in both asset values and macroeconomic variables. Such data and predictions can be directly incorporated into existing and future models for selecting stocks and other assets to purchase and sell, thereby having direct application to asset portfolio management and financial planning. In fact, many existing models incorporate sectoral statistics for just such purposes. The results of this aspect of the present invention can be used beneficially in such models. Moreover, because sectoral analysis of the present invention overcomes many of the problems of conventional sectoral analysis techniques, substitution using the results of the present technique often will provide more accurate information, thus permitting those models to provide more effective buy/sell strategies.

Design System Environment.

Figure 4:
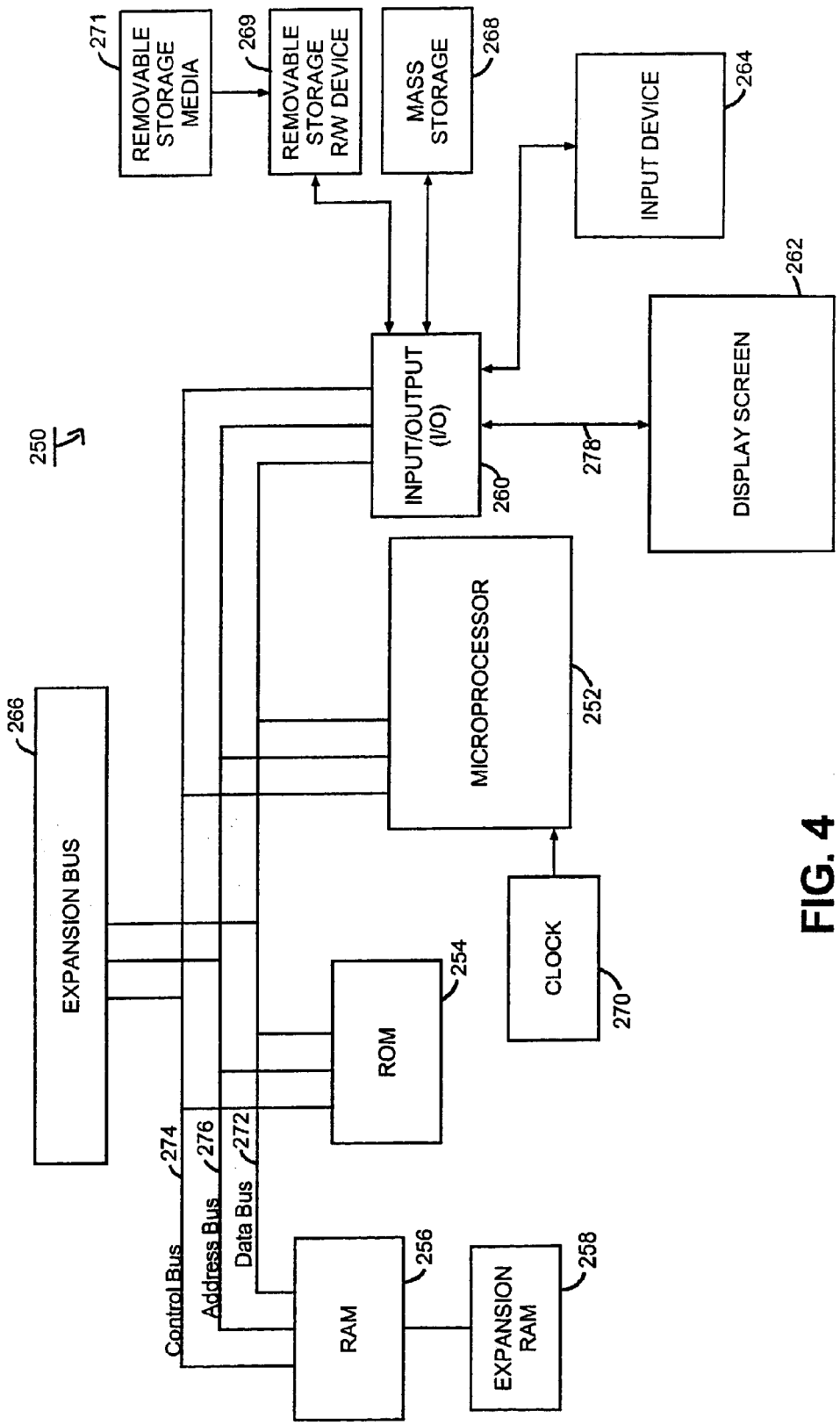
FIG. 4 is a block diagram of a general-purpose computer system, representing one suitable computer platform for implementing the methods of the present invention.

Generally, the methods described herein will be practiced with a general-purpose computer, either with a single processor or multiple processors. FIG. 4 is a block diagram of a general-purpose computer system, representing one of many suitable computer platforms for implementing the methods described above. FIG. 4 shows a general-purpose computer system 250 in accordance with the present invention. As shown in FIG. 4, computer system 250 includes a central processing unit (CPU) 252, read-only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 270.

CPU 252 is coupled to ROM 254 by a data bus 272, control bus 274, and address bus 276. ROM 254 contains the basic operating system for the computer system 250. CPU 252 is also connected to RAM 256 by busses 272, 274, and 276. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, and mass storage 268.

Display assembly 262 of computer system 250 is an output device coupled to I/O circuitry 260 by a data bus 278. Display assembly 262 receives data from I/O circuitry 260 via bus 278 and displays that data on a suitable screen.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. The aforementioned input devices are available from a variety of vendors and are well known in the art.

Some type of mass storage 268 is generally considered desirable. However, mass storage 268 can be eliminated by providing a sufficient mount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

A removable storage read/write device 269 may be coupled to I/O circuitry 260 to read from and to write to a removable storage media 271. Removable storage media 271 may represent, for example, a magnetic disk, a magnetic tape, an opto-magnetic disk, an optical disk, or the like. Instructions for implementing the inventive method may be provided, in one embodiment, to a network via such a removable storage media.

In operation, information is input into the computer system 250 by typing on a keyboard, manipulating a mouse or trackball, or "writing" on a tablet or on position-sensing screen of display assembly 262. CPU 252 then processes the data under control of an operating system and an application program, such as a program to perform some or all of the steps of the inventive methods described above, stored in ROM 254 and/ or RAM 256. It is noted that such process steps may initially be stored in mass storage 268, downloaded into RAM 256 and then executed out of RAM 256. CPU 252 then typically produces data which is output to the display assembly 262 to produce appropriate images on its screen.

Expansion bus 266 is coupled to data bus 272, control bus 274, and address bus 276. Expansion bus 266 provides extra ports to couple devices such as network interface circuits, modems, display switches, microphones, speakers, etc. to CPU 252. Network communication is accomplished through the network interface circuit and an appropriate network.

Suitable computers for use in implementing the present invention may be obtained from various vendors. Various computers, however, may be used depending upon the size and complexity of the tasks. Suitable computers include mainframe computers, multiprocessor computers, workstations or personal computers. In addition, although a general purpose computer system has been described above, a special-purpose computer may also be used.

It should be understood that the present invention also relates to machine readable media on which are stored program instructions for performing some or all of the methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

CONCLUSION

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood those skilled in the art.

What is claimed is:

1. A computer system for evaluating and screening assets, said method comprising:
    at least one data storage device storing computer program instructions; and
    at least one computer processor coupled to the at least one data storage device and configured to retrieve and execute the computer program instructions, said computer program instructions including steps of:
    (a) obtaining a price formula for estimating the value of an asset as a function of identified exogenous variables;
    (b) repeating step (a) for each asset in a specified set;
    (c) inputting hypothetical scenario values for the exogenous variables;
    (d) calculating a value for each asset in the specified set using the price formula obtained in step (a) for said asset with the hypothetical scenario values input for the exogenous variables in step (c);
    (e) calculating a measure of a tendency of the value of each asset in the specified set to change as a result of a change in the data value for at least one of the exogenous variables, based on the input hypothetical scenario values for the exogenous variables;
    (f) inputting screening criteria based on asset value and tendency of asset value to change;
    (g) screening assets in the specified set in accordance with the input screening criteria and results of steps (d) and (e); and
    (h) at least one of: (1) providing screening results from step (g) to a user, (2) recommending a purchase or sale to a user based on the screening results from step (g), or (3) automatically purchasing or selling an asset based on the screening results from step (g).

2. A computer system according to claim 1, wherein step (e) comprises estimating a derivative of the price formula obtained in step (a) for said each asset.

3. A computer system according to claim 1, wherein said price formula is obtained in step (a) by performing a statistical regression analysis using historical data for the value of the asset and historical data values for the identified exogenous variables.

4. A computer system according to claim 1, wherein said price formula obtained in step (a) is in a format of a truncated Taylor series expansion.

5. A computer system according to claim 1, wherein said price formula obtained in step (a) describes a logarithm of the value of said asset as a function of logarithms of said identified exogenous variables.

6. A computer system according to claim 1, further comprising a step of repeating steps (c)-(h) using different sets of hypothetical scenario values for the exogenous variables.

7. A computer system according to claim 1, wherein said price formula is obtained by performing neural network processing using historical data for the value of the asset and historical data values for the identified exogenous variables.

8. A computer system according to claim 7, wherein said measure of tendency to change is calculated in step (e) by inputting different data values for the at least one of the exogenous variables into the price formula for said each asset and observing how an output of the price formula for said each asset changes as a result of small changes in the data values for the exogenous variables.

9. A computer system according to claim 1, wherein said price formula is obtained in step (a) by using a genetic algorithm.

10. A computer-readable medium storing computer-executable process steps for evaluating a portfolio of assets, said process steps comprising steps to:
    (a) obtain a price formula for estimating the value of an asset as a function of identified exogenous variables;
    (b) repeat step (a) for each asset in a specified set;
    (c) input hypothetical scenario values for the exogenous variables;
    (d) calculate a value for each asset in the specified set using the price formula obtained in step (a) for said asset with the hypothetical scenario values input for the exogenous variables in step (c);
    (e) calculate a measure of a tendency of the value of each asset in the specified set to change as a result of a change in the data value for at least one of the exogenous variables, based on the input hypothetical scenario values for the exogenous variables;

(f) input screening criteria based on asset value and tendency of asset value to change;

(g) screen assets in the specified set in accordance with the input screening criteria and results of steps (d) and (e); and (h) at least one of: (1) provide screening results from step (g) to a user, (2) recommend a purchase or sale to a user based on the screening results from step (g), or (3) automatically purchase or sell an asset based on the screening results from step (g).

11. A computer system according to claim 1, wherein step (h) comprises automatically purchasing or selling an asset based on the screening results from step (g).

12. A computer system according to claim 1, wherein the price formula is generated in step (a) by processing historical data for the value of the asset and historical data values for the plural exogenous variables in order to generate the price formula.

13. A computer system according to claim 1, wherein said measure of tendency to change is calculated in step (e) from the price formula obtained in step (a) for said each asset.

14. A computer system according to claim 1, wherein said computer program instructions further include a step of (i) combining the measure calculated in step (e) for each asset in a specified portfolio in order to determine a combined measure of the tendency of the value of the specified portfolio as a whole to change as a result of a change in the data value for said at least one of the exogenous variables.

15. A computer system according to claim 14, wherein said computer program instructions further include a step of (j) combining the value calculated in step (d) for each asset in the specified portfolio in order to determine a combined value of the specified portfolio as a whole.

16. A computer system according to claim 15, wherein said computer program instructions further include a step of (k) repeating steps (i) and (j) for each of a plurality of different portfolios, and wherein the assets screened in step (g) comprise said plurality of different portfolios.

* * * * *

UNITED STATES PATENT AND TRADEMARK OFFICE
CERTIFICATE OF CORRECTION

PATENT NO.        : 8,249,970 B1
APPLICATION NO.   : 10/346794
DATED             : August 21, 2012
INVENTOR(S)       : G. Michael Phillips et al.

It is certified that error appears in the above-identified patent and that said Letters Patent is hereby corrected as shown below:

In column 1 line 21, change "finance.yahoo.corn" to --finance.yahoo.com--.

In column 3 line 36, change "anytime period" to --any time period--.

In column 19 line 12, change "among clusters overtime" to --among clusters over time--.

Signed and Sealed this
Second Day of October, 2012

David J. Kappos
*Director of the United States Patent and Trademark Office*